(12) United States Patent
Watanabe (10) Patent No.: US 7,942,336 B2
(45) Date of Patent: May 17, 2011

(54) PORTABLE TERMINAL

(75) Inventor: Hiroshi Watanabe, Hachioji (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 540 days.

(21) Appl. No.: 12/072,346

(22) Filed: Feb. 26, 2008

(65) Prior Publication Data

US 2008/0203174 A1 Aug. 28, 2008

(30) Foreign Application Priority Data

Feb. 28, 2007 (JP) ................ P2007-050589

(51) Int. Cl.
*G06K 7/00* (2006.01)
*G06K 19/00* (2006.01)
*G06K 19/06* (2006.01)
*G08B 13/14* (2006.01)

(52) U.S. Cl. ........ 235/492; 205/451; 205/487; 205/435; 340/572.7; 343/700 R (58) Field of Classification Search .................. 235/435, 235/451, 487, 492; 340/572.7
See application file for complete search history.

(56) References Cited

U.S. PATENT DOCUMENTS

| 7,460,018 B2 | 12/2008 | Kubo |
| 7,561,114 B2 | 7/2009 | Maezawa et al. |
| 2007/0069961 A1 * | 3/2007 | Akiho et al. ........... 343/702 |
| 2009/0085819 A1 | 4/2009 | Watanabe |
| 2009/0189742 A1 | 7/2009 | Watanabe |

FOREIGN PATENT DOCUMENTS

| JP | 2003-067689 A | 3/2003 |
| JP | 2006-005836 A | 1/2006 |
| JP | 2006-178713 A | 7/2006 |
| JP | 2007-122225 A | 5/2007 |

OTHER PUBLICATIONS

U.S. Appl. No. 12/148,974; First Named Inventor: Hiroshi Watanabe; Title: "Radio System, Radio Apparatus, and Antenna Device"; Filed: Apr. 24, 2008, published as US 2009/0085819.
U.S. Appl. No. 12/148,797; First Named Inventor: Hiroshi Watanabe; Title: "Radio Communication Device and Radio Communication System"; Filed: Apr. 22, 2008, published as US 2009/0189742.

* cited by examiner

*Primary Examiner* — Michael G Lee
*Assistant Examiner* — Laura Gudorf
(74) *Attorney, Agent, or Firm* — Maschoff Gilmore & Israelsen

(57) ABSTRACT

According to an aspect of the invention, there is provided a portable terminal which non-contact communicates with an external reader/writer at a specified relative position to the reader/writer, including: a second antenna configured to carry out non-contact communication with a loop shaped first antenna whose arrangement position and size are defined in the external reader/writer; and a magnetic sheet having no magnetic body in a part of a region where the magnetic sheet at least partly overlaps with the first antenna when the portable terminal is at the specified relative position to the external reader/writer.

8 Claims, 10 Drawing Sheets

FIG. 1

EXTERNAL APPEARANCE VIEW OF NON-CONTACT COMMUNICATION SYSTEM (A): PORTABLE TERMINAL 100

(B): READER/WRITER 200

UPPER SURFACE

REAR SURFACE

POSITIONAL RELATIONSHIP BETWEEN PORTABLE TERMINAL AND READER/WRITER

PORTABLE TERMINAL

CROSS-REFERENCE TO RELATED APPLICATIONS

This application is based on and claims the benefit of priority from the prior Japanese Patent Application No. 2007-50589, filed on Feb. 28, 2007; the entire contents of which are incorporated herein by reference.

The present invention relates to a portable terminal loaded with a RFID (Radio Frequency Identification) antenna and an IC tag, etc. to carry out non-contact communication with an external reader/writer.

BACKGROUND

It is disclosed by, for example, JP-A-2006-5836 (pages 4-7, FIGS. 2, 3, 6) that a portable information terminal is loaded with an antenna module and an IC tag, which is inductive-coupled with an antenna portion of an external reader/writer to carry out communication with it.

A portable information terminal disclosed in JP-A-2006-5836 is loaded with an antenna module 10 and a battery pack 4. Then, communication is carried out between the antenna module 10 and an external reader/writer. In order to prevent deterioration of communication performance caused by generation of an eddy current on a metal surface of the battery pack 4 under the influence of a magnetic field generated as the time of this communication, the antenna module 10 is provided with a magnetic core member 18 (magnetic sheet) in which soft magnetic powders are mixed (See FIG. 3 of JP-A-2006-5836). An opening portion 18a for accommodating a signal processing circuit section 16 is formed in the magnetic core member 18 serving as a magnetic sheet.

In a portable information terminal disclosed in JP-A-2006-5836, the magnetic core member 18 serving as a magnetic sheet reduces an eddy current on a metal surface of the battery pack 4. However, the opening portion 18a is formed in the magnetic core member 18, and an eddy current reduction effect has been already reduced.

SUMMARY

According to an aspect of the invention, there is provided a portable terminal which non-contact communicates with an external reader/writer at a specified relative position to the reader/writer, including: a second antenna configured to carry out non-contact communication with a loop shaped first antenna whose arrangement position and size are defined in the external reader/writer; and a magnetic sheet having no magnetic body in a part of a region where the magnetic sheet at least partly overlaps with the first antenna when the portable terminal is at the specified relative position to the external reader/writer.

DESCRIPTION OF THE EMBODIMENTS

Hereinafter, embodiments of the present invention are explained with reference to drawings.

Embodiments

Figure 1:
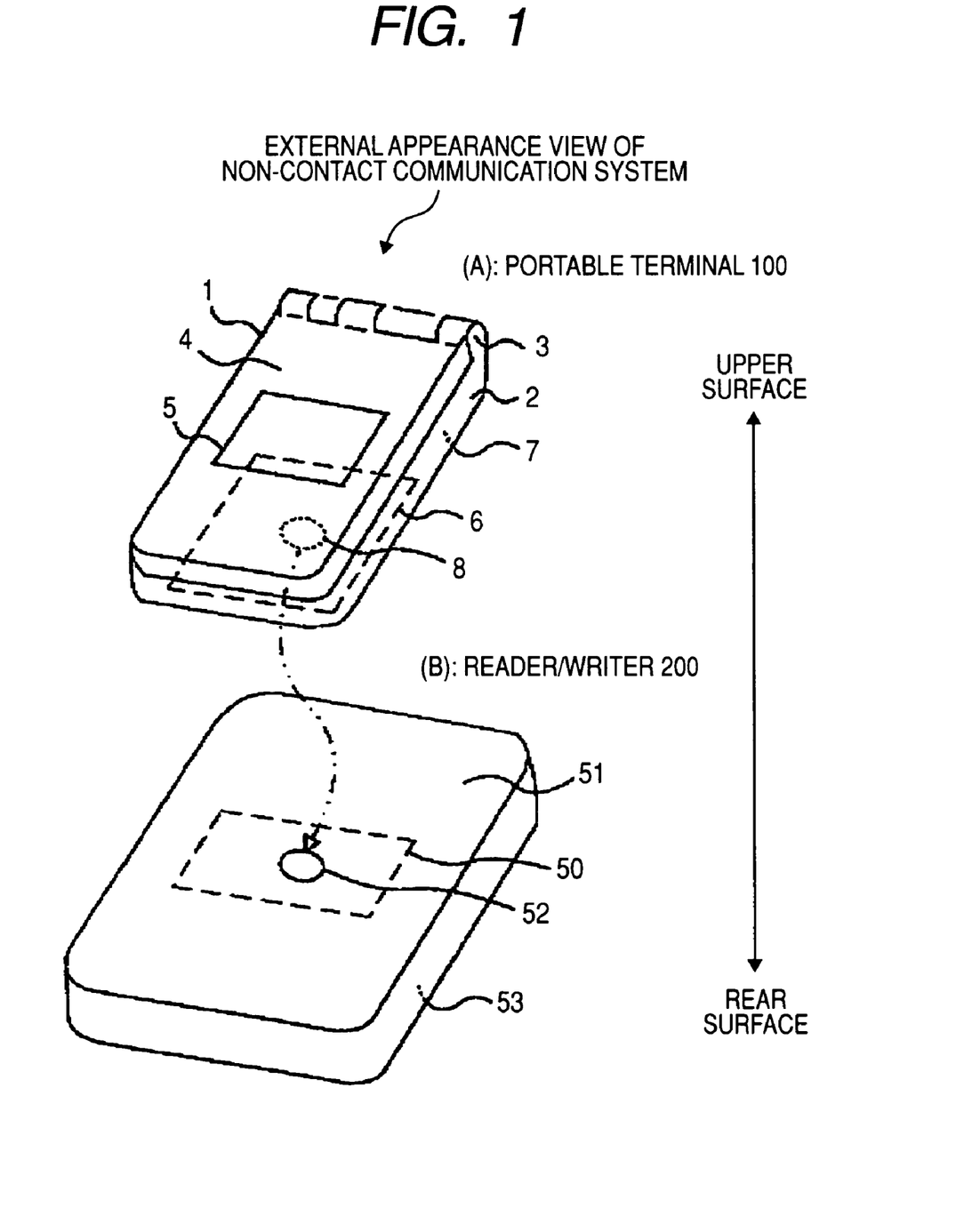
FIG. 1 is an exemplary external appearance view of a portable terminal and a reader/writer in a non-contact communication system in an embodiment of the present invention.

FIG. 1 is an external appearance view of a portable terminal and a reader/writer in a non-contact communication system in an embodiment of the present invention. FIG. 1 shows such a state that a portable terminal has been folded up.

As for a portable terminal 100, an upper housing 1 and a lower housing 2 engage with each other so as to freely rotate by a hinge 3. On an upper surface 4 side of the upper housing 1, a sub display section 5 is arranged. In the lower housing 2, a loop shaped RFID antenna 6 is incorporated. On a rear surface 7 side of the lower housing 2, there is an alignment mark 52 at a place that is visible from a user. The rear surface 7 is a side that faces the reader/writer 200.

The reader/writer 200 is a small size reader/writer to be installed in, e.g., a convenience store etc. As for the reader/writer 200, a loop shaped RW antenna 50 is incorporated in a portion that is close to the upper surface 51. On an upper surface 51 side, there is an alignment mark 52 at a place that is visible from a user. The upper surface 51 is a side that faces the portable terminal 100.

A user places the portable terminal 100 and the reader/writer 200 in a manner that the alignment mark 8 of the portable terminal 100 is made to face and overlap with the alignment mark 52 of the reader/writer 200, and non-contact communication between the RFID antenna 6 and the RW antenna 50 is carried out to carry out account settlement for shopping etc.

Figures 2A, 2B, 2C:
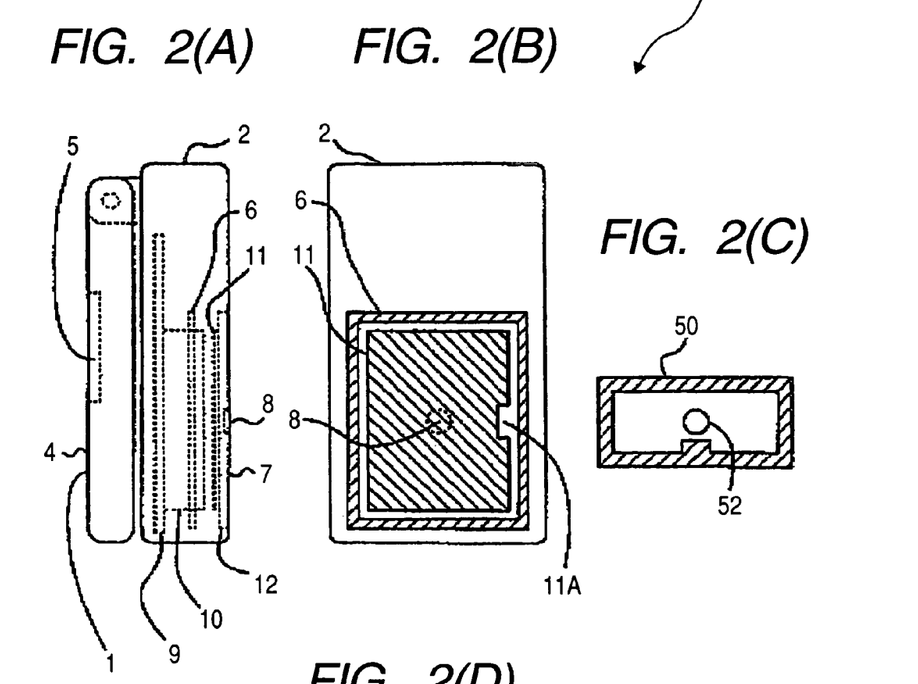
FIGS. 2(A)-2(D) are exemplary views explaining a positional relationship between the portable terminal and the reader/writer in the embodiment.
Figure 2D:
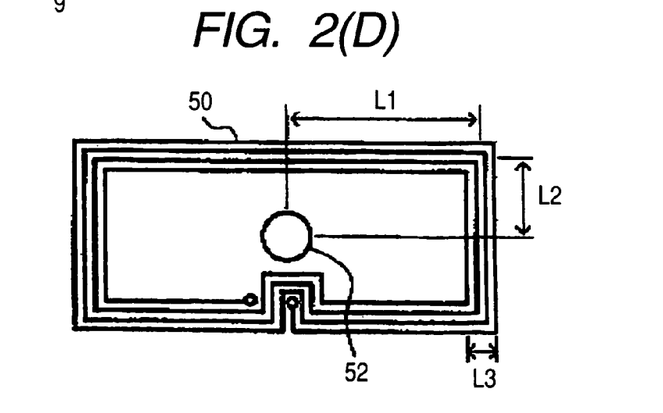

FIGS. 2(A) to 2(D) are views explaining a positional relationship between the portable terminal and the reader/writer in the embodiment, and FIG. 2(A) shows a side view of the portable terminal 100. FIG. 2(B) shows a view seen through the portable terminal 100 from the upper surface side thereof, and shows diagrammatically relevant things. FIG. 2(C) shows a view seen through the reader/writer 200 from the upper surface side thereof, and shows diagrammatically relevant things. FIG. 2(D) shows a detail view of the RW antenna.

In FIG. 2(A) and FIG. 2(B), there are a printed board 9, a battery pack 10, a RFID antenna 6, a magnetic sheet 11, and a battery lid 12 in the lower casing 2 of the portable terminal 100. The RFID antenna 6 is formed by a conductor pattern that is looped more than once on a printed board that is not shown in the figure. An IC tag, etc., which is not shown in the figure, is mounted on the printed board 9, and connected to the RFID antenna 6. The battery pack 10 is arranged in a hollow portion of the loop shaped RFID antenna 6. The battery pack 10 is made of a metal enclosure pack.

The magnetic sheet 11 is a thing in which soft magnetic powders are mixed, and which is formed in the shape of a sheet, and pasted on an inner surface side of the battery lid 12. A size of the magnetic sheet 11 occupies a region that nearly overlaps with a surface of the battery pack 10 that faces the rear surface 7 side. An eddy current is generated in a metal portion of the battery pack 10 by magnetic force lines generated during a period of non-contact communication between the portable terminal 100 and the reader/writer 200 so that communication performance deteriorates, but the magnetic sheet 11 prevents it. There is a cutout 11A in the magnetic sheet 11, and this is a portion of a back clearance for a nail (not shown in the figure) for opening and closing the battery lid 12. There is the alignment mark 8 in the rear surface 7 side of the battery lid 12.

The RFID antenna 6 may be arranged on the rear surface 7 side rather than the battery pack 10. The magnetic sheet 11 may be arranged on a front surface side of the battery pack 10, but not on the battery lid 12. The arrangement enables the magnetic sheet 11 to exercise the same effect, since magnetic force lies, which are generated between the RFID antenna 6 and the RW antenna 50 at the time of communication, are generated on not only the rear surface 7 side of the RFID antenna 6 but also a side opposite to the rear surface 7 of the RFID antenna 6.

As shown FIG. 2(C), There is an alignment mark 52 on the upper surface 51 side of the reader/writer 200. In addition, the RW antenna 50 is arranged on the inner side thereof.

FIG. 2(D) shows a detail view of the RW antenna 50. The RW antenna 50 is formed by a conductor pattern that is looped more than once on a printed board that is not shown in the figure. Relative positions between the RW antenna 50 and the alignment mark 52 have been defined in advance like dimensions L1, L2, L3. In (C), the entire loop portion of this conductor pattern, which is looped more than once, is shown in the figure by hatching.

When the portable terminal 100 and the reader/writer 200 are viewed from upper surfaces thereof, a user put the portable terminal in a manner that the alignment mark 8 of the portable terminal 100 overlaps with the alignment mark 52 of the reader/writer 200.

Figure 3A:
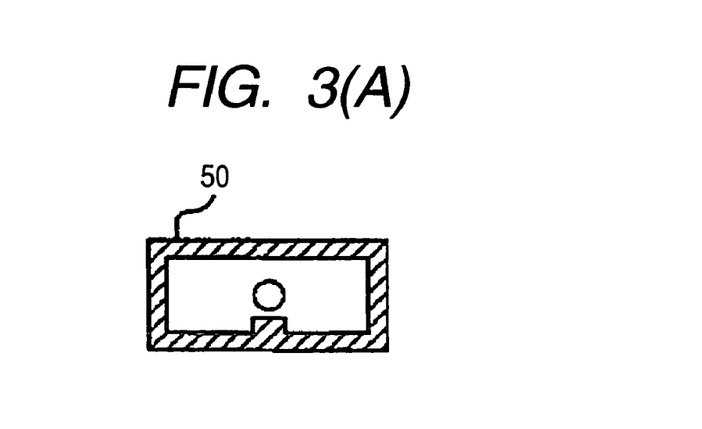
FIGS. 3(A), 3(B) are exemplary views explaining resonance frequency in a single body of the reader/writer in the embodiment.
Figure 3B:
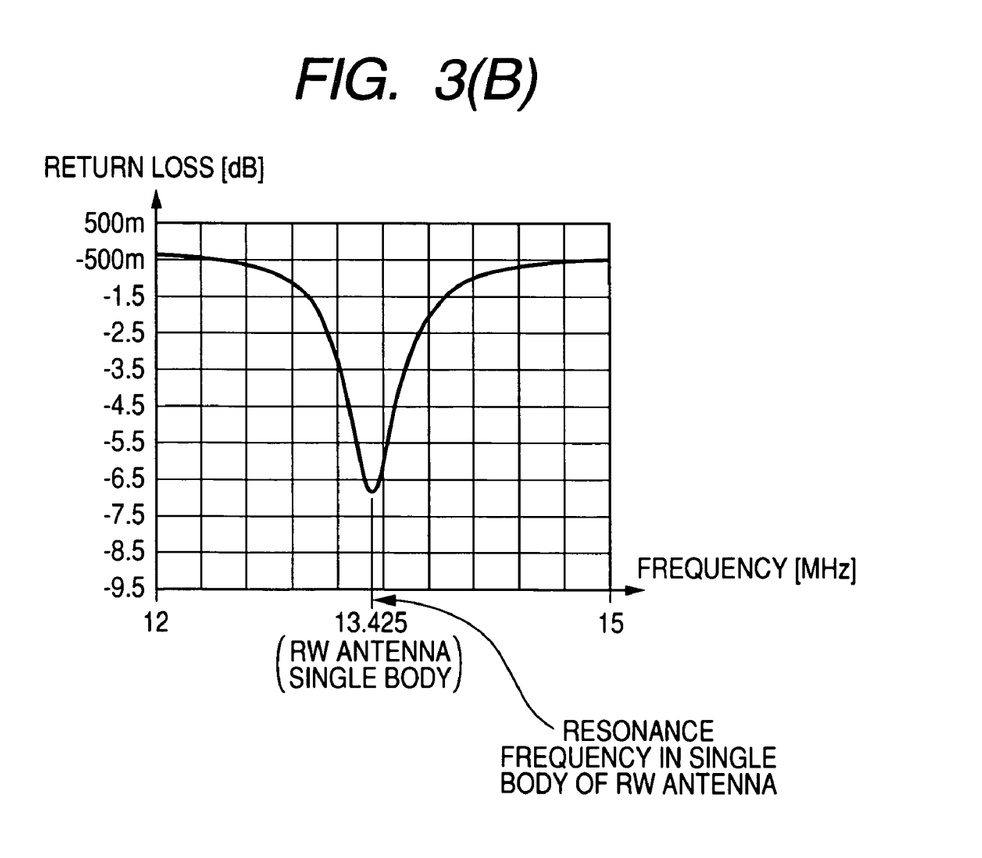

FIGS. 3A, 3B are views explaining resonance frequency in a single body of the reader/writer in the embodiment. FIG. 3B shows data of the resonance frequency in a single body of the reader/writer, without the portable terminal 100 and the reader/writer 200 coming close to each other. A horizontal axis is frequency [MHz], and a vertical axis is return loss [dB]. As for the resonance frequency, data of 13.425 [MHz] is obtained.

In case that the portable terminal 100 and the reader/writer 200 come close to each other to carry out non-contact communication, a resonance frequency drifts from resonance frequency in a single body of the reader/writer by the magnetic sheet 11 using for eddy current prevention, as described above, and communication become impossible if the drift is large.

With regard to various shapes of the magnetic sheet of the portable terminal 100, an evaluation is carried out about drift of the resonance frequency and whether or not communication is possible, as described below.

Figure 4A:
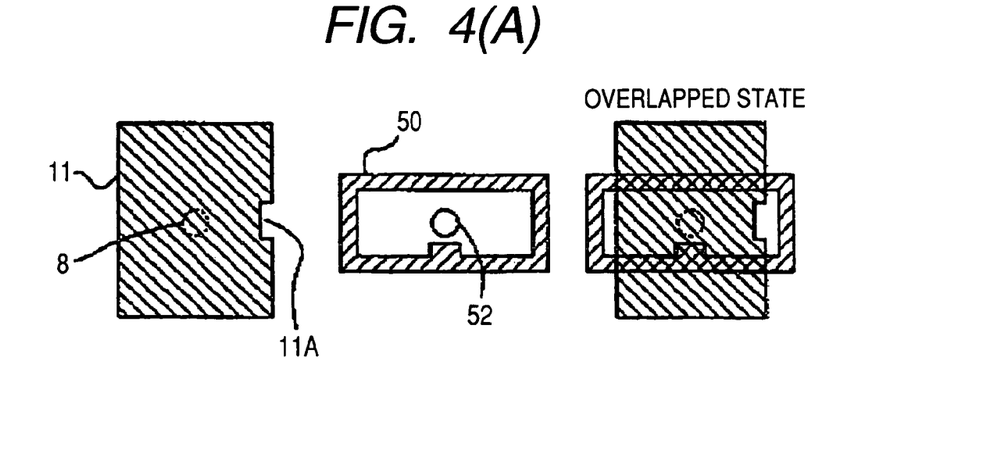
FIGS. 4(A), 4(B) are exemplary views explaining resonance frequency at non-contact communication in the embodiment.
Figure 4B:
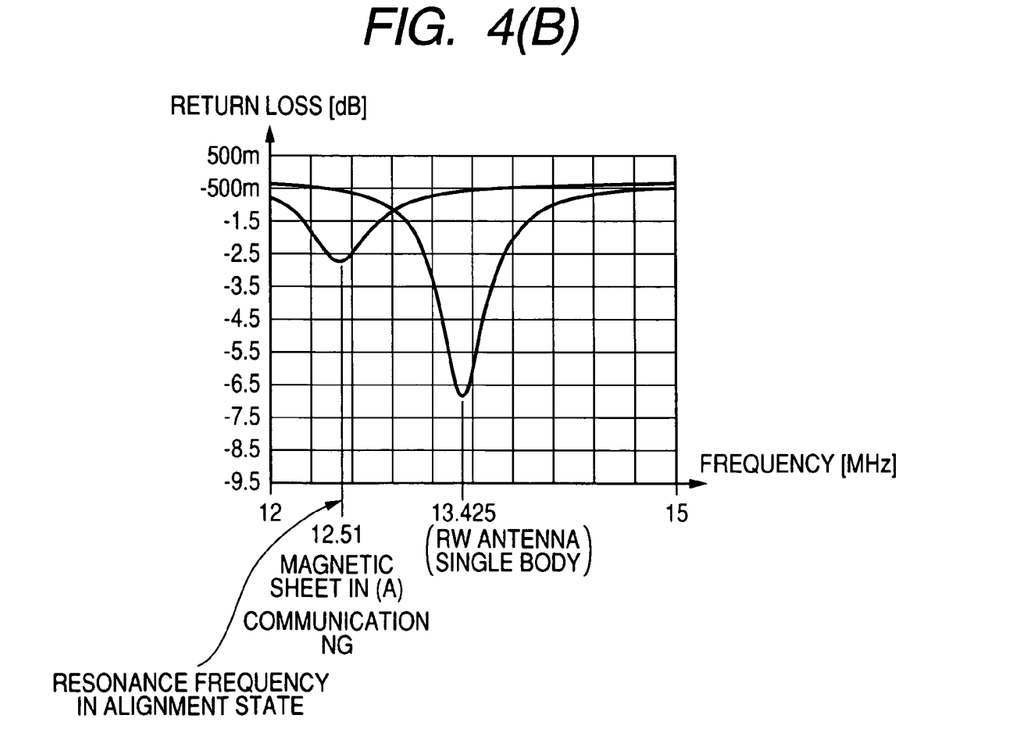

FIGS. 4(A), 4(B) are views explaining the resonance frequency at non-contact communication in the embodiment. The magnetic sheet 11 of the portable terminal 100 does not have a special cut other than the cutout 11A.

FIG. 4(A) shows diagrammatically such a state that the magnetic sheet 11 of the portable terminal 100 and the RW antenna 50 of the reader/writer 200 are overlapped with each other so as to align the alignment marks of both of them, in a state seen through them from upper surface sides thereof. The magnetic sheet 11 does not have a special cut portion other than the cutout 11A, and therefore, it is possible to suppress most generation of an eddy current in a metal portion of the battery pack 10 (FIG. 2(A)) during a period of non-contact communication between the portable terminal 100 and the reader/writer 200. However, there is a problem in resonance frequency, as described later.

FIG. 4(B) shows data of resonance frequency during a period of non-contact communication between the portable terminal 100 and the reader/writer 200, i.e., at the time that the positional relationship of the overlapped state in FIG. 4(A) has existed. Resonant frequency data (FIG. 3(B)) in a single body of the RW antenna is described together. With respect to the resonance frequency 13.425 [MHz] in a single body of the RW antenna, resonance frequency at the time that the magnetic sheet shown in FIG. 4(A) has been overlapped becomes 12.51 [MHz], and drift is large, and therefore, communication performance of non-contact communication between the portable terminal 100 and the reader/writer 200 deteriorates, and communication NG occurred.

Figure 5A:
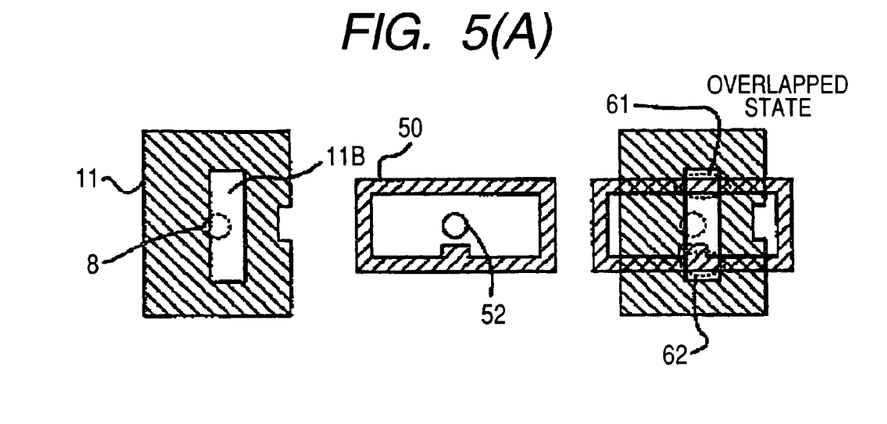
FIGS. 5(A), 5(B) are exemplary views explaining resonance frequency at non-contact communication in the embodiment.
Figure 5B:
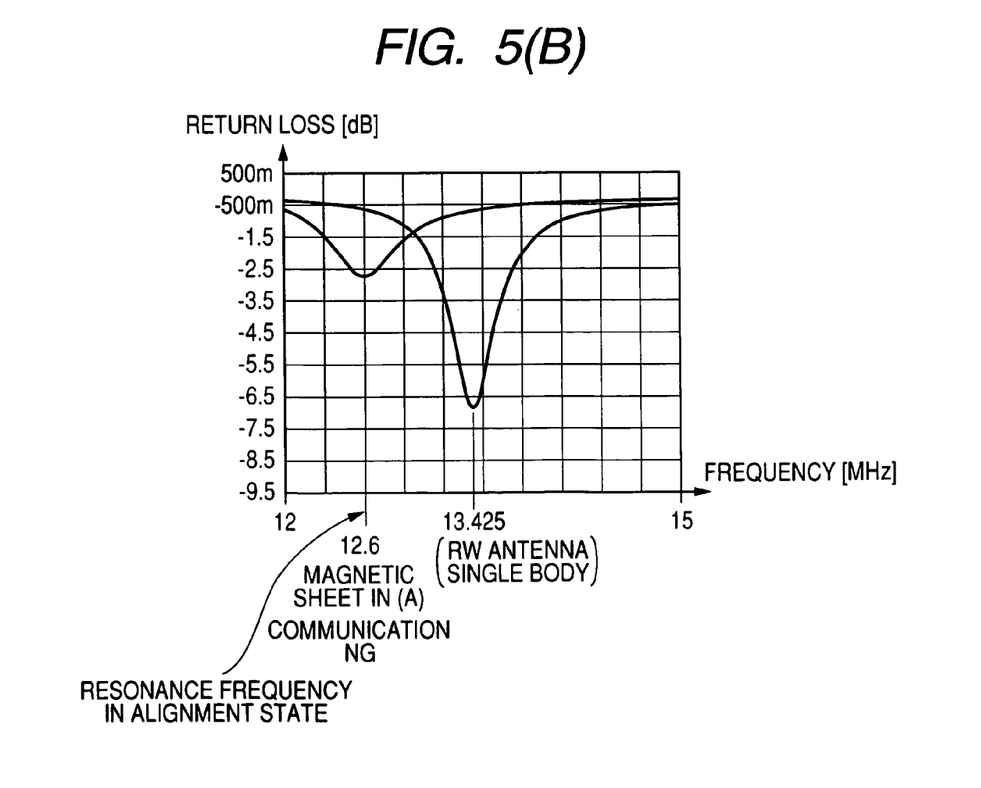

FIGS. 5(A),5(B) are views explaining resonance frequency at the time of non-contact communication in the embodiment. The magnetic sheet 11 of the portable terminal 100 has a cut 11B in addition to the cutout 11A. The cut 11B is a hollow cut that is not in contact with an outside end portion of the magnetic sheet 11.

As shown in FIG. 5(A), the cut 11B, when it is overlapped, overlaps with a part of a lateral direction bar of the RW antenna 50. The overlapping portions 61, 62, which are shown by dotted-line ellipse, are portions where the cut 11B and the lateral direction bar of the RW antenna 50 overlap.

As shown in FIG. 5(B), resonance frequency becomes 12.6 [MHz] and is improved in a direction of coming close to the resonance frequency 13.425 [MHz] in a single body of the RW antenna, as compared with 12.51 [MHz] in FIG. 4.

However, the shape of the magnetic body, as shown in FIG. 5(A) results in communication NG. A portion between the overlapping portions 61 and 62 is deleted extra, and for this reason, an eddy current reduction effect of the battery pack 10 (FIG. 2) goes down, and communication NG occurred due to an influence thereof.

Figure 6A:
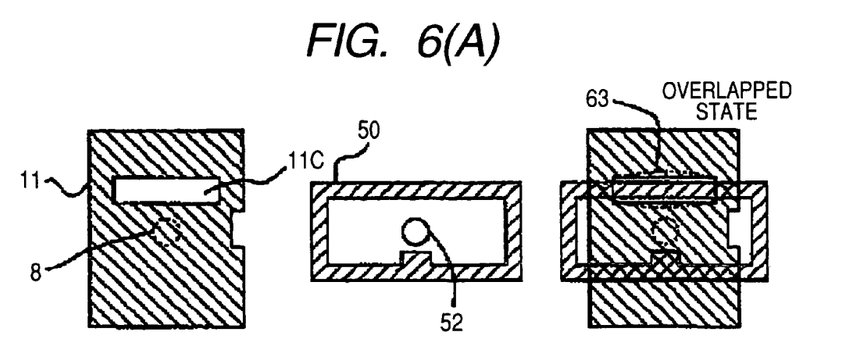
FIGS. 6(A), 6(B) are exemplary views explaining resonance frequency at non-contact communication in the embodiment.
Figure 6B:
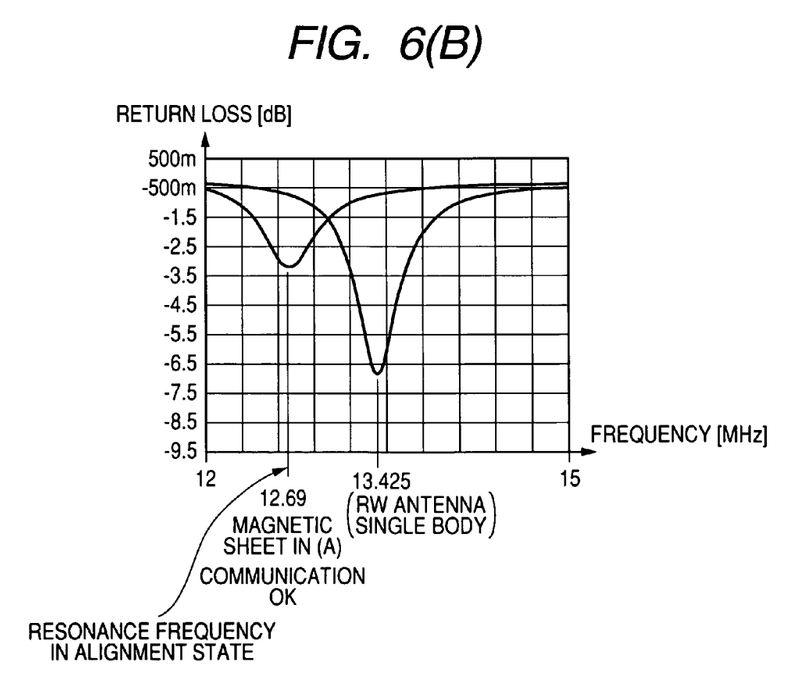

FIGS. 6(A), 6(B) are views explaining resonance frequency at the time of non-contact communication in the embodiment. The magnetic sheet 11 of the portable terminal 100 has a hollow cut 11C. The cut 11B in FIG. 5 is also in the hollow shape, but layouts thereof differ.

As shown in FIG. 6(A), the cut 11C is in the shape of a rectangular having nearly the same width as a width of the lateral direction bar of the RW antenna 50 and has a predetermined length. An extra deletion portion other than the overlapping portion 63 shown by a dotted line eclipse does not exists. In addition, a length of the overlapping portion 63, i.e., a length of the cut 11C is longer than a length obtained by joining the overlapping portions 61 and 62 in FIG. 5.

As shown in FIG. 6(B), resonance frequency becomes 12.69 [MHz], and is improves in a direction of coming close to the resonance frequency 13.425 [MHz] in a single body of the RW antenna, as compared with 12.6 [MHz] in FIG. 5.

In addition, communication is also possible. Communication became possible in combination with maintenance of the eddy current reduction effect due to no extra deletion of the magnetic body, together with improvement of resonance frequency.

In this way, it is not possible to clearly fix a region in which communication is possible, only by a numerical value of resonance frequency, but it is possible to improve communication performance, together with maintaining the eddy current reduction effect.

Figure 7A:
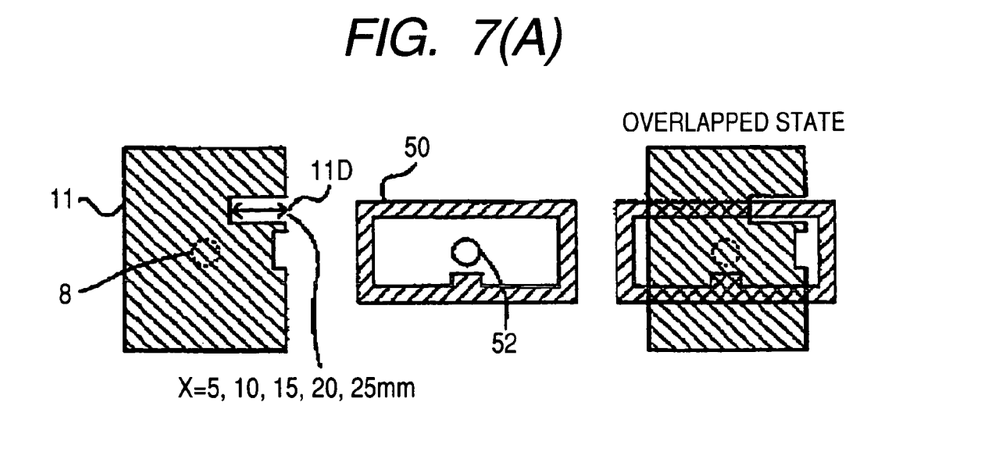
FIGS. 7(A), 7(B) are exemplary views explaining resonance frequency at non-contact communication in the embodiment.
Figure 7B:
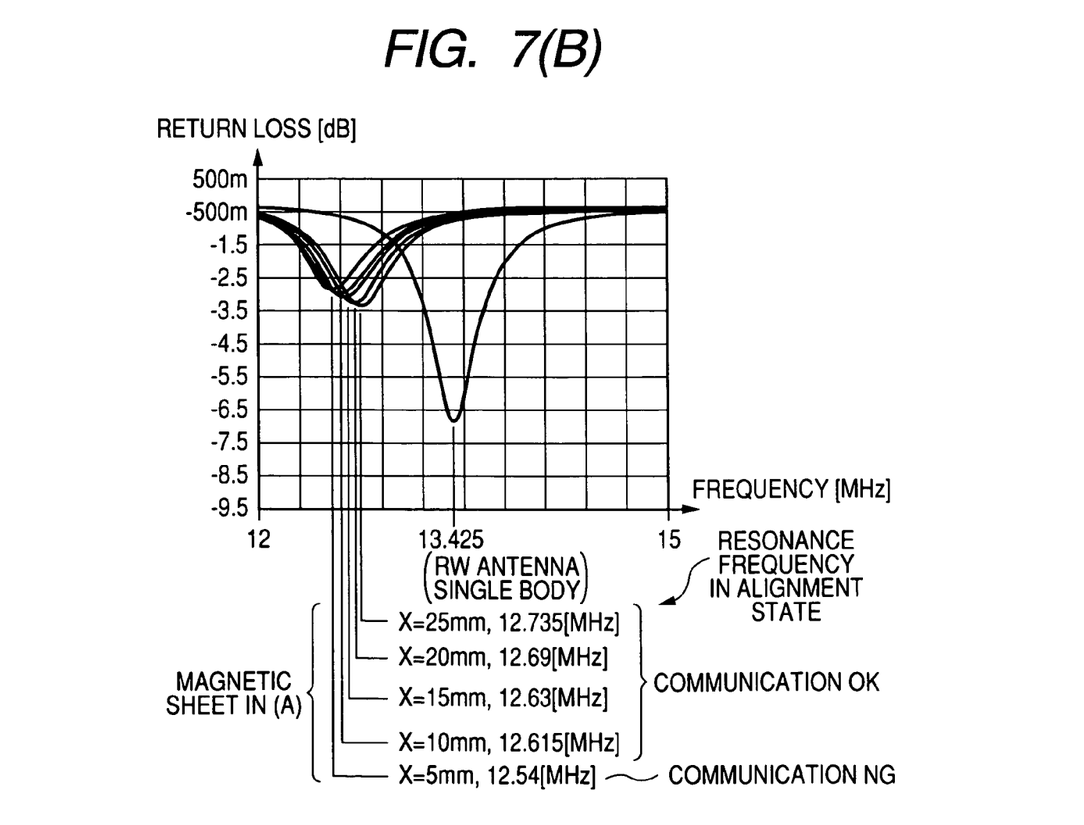

FIGS. 7(A), 7(B) shows views explaining resonance frequency at non-contact communication in the embodiment. The magnetic sheet 11 of the portable terminal 100 has a cut 11D. The cut 11D is a cut that is in contact with an outer end portion of the magnetic sheet 11.

As shown in FIG. 7(A), the cut 11D, when it is overlapped, overlaps with a part of the lateral direction bar of the RW antenna 50. Display of a dotted line ellipse of an overlapping portion is omitted. A case that lengths X of the cut 11D are set to 5 mm, 10 mm, 15 mm, 20 mm, and 25 mm was evaluated.

As shown in FIG. 7(B), resonance frequency at X=5 mm was 12.54 [MHz], and resonance frequency at X=10 mm was 12.615 [MHz], and resonance frequency at X=15 mm was 12.63 [MHz], and resonance frequency at X=20 mm was 12.69 [MHz], and resonance frequency at X=25 mm was 12.735 [MHz]. In addition, with regard to communication performance, communication was possible to at X=10 mm or more. It is desirable that X is 10 mm or more, and furthermore, it is much better if it is 15 mm or more.

Figure 8A:
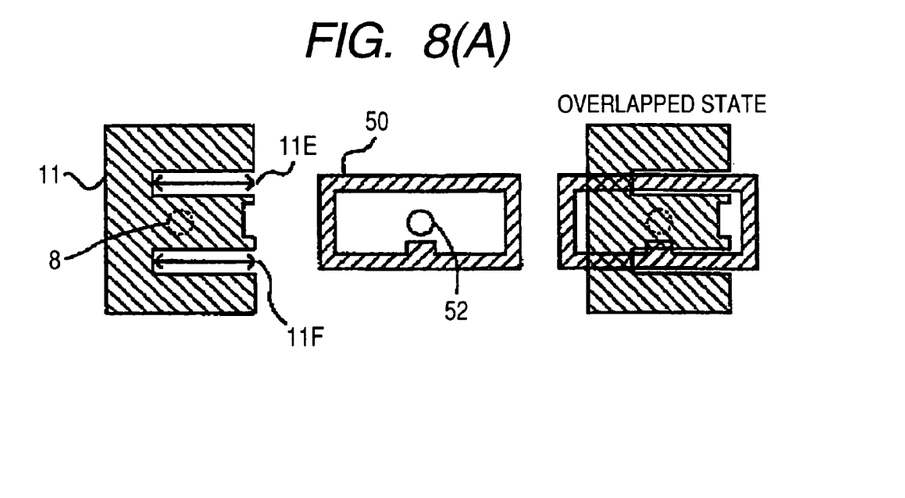
FIGS. 8(A), 8(B) are exemplary views explaining resonance frequency at non-contact communication in the embodiment.
Figure 8B:
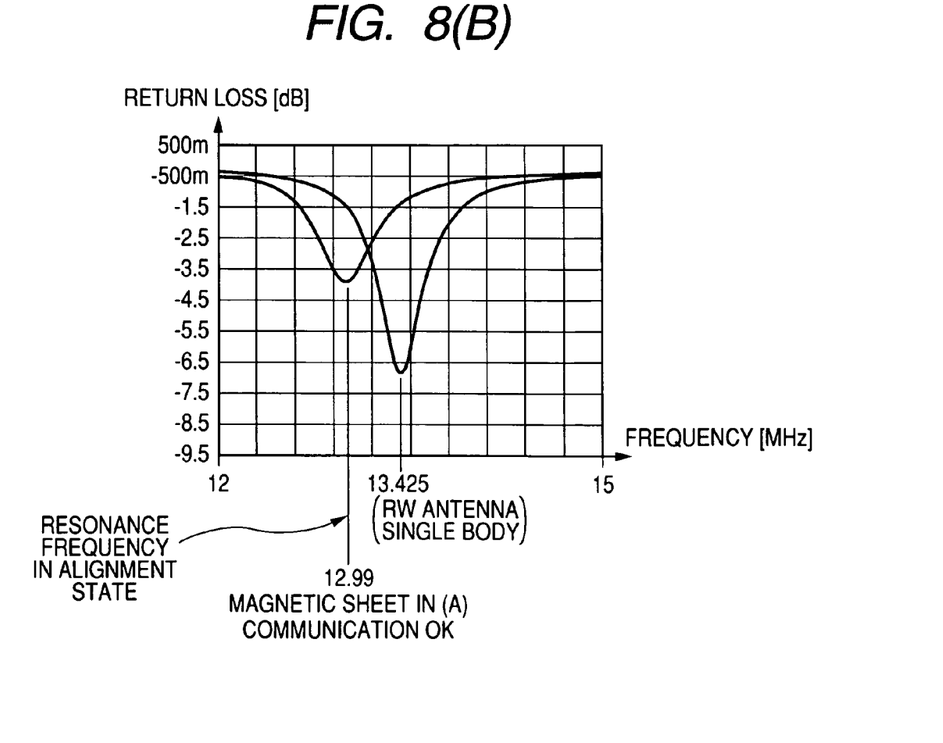

FIGS. 8(A), 8(B) are views explaining resonance frequency at the time of non-contact communication in the embodiment. The magnetic sheet 11 of the portable terminal 100 has cuts 11E and 11F.

As shown in FIG. 8(A), the cuts 11E and 11F, when they are overlapped, overlap with a part of the lateral direction bar of the RW antenna 50. A case of a length X=20 mm of the cut was evaluated.

As shown in FIG. 8(B), resonance frequency is 12.99 [MHz] and communication was also possible.

Figure 9A:
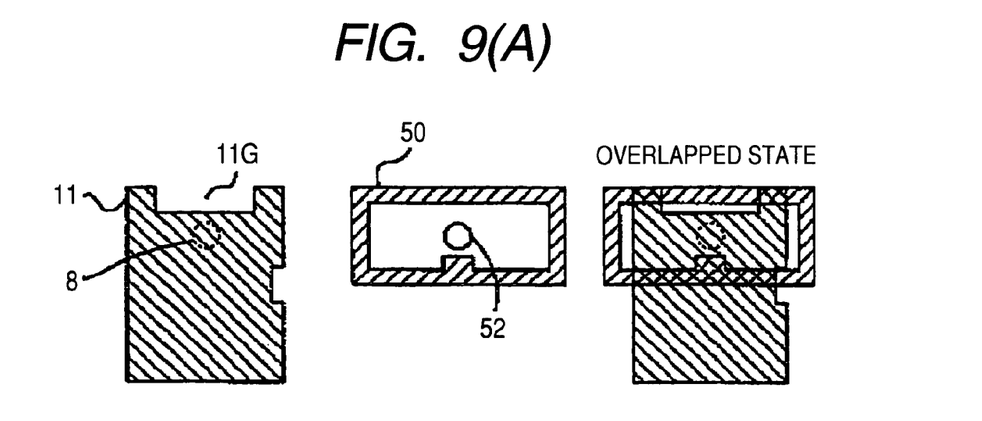
FIGS. 9(A), 9(B) are exemplary views explaining resonance frequency at non-contact communication in the embodiment.
Figure 9B:
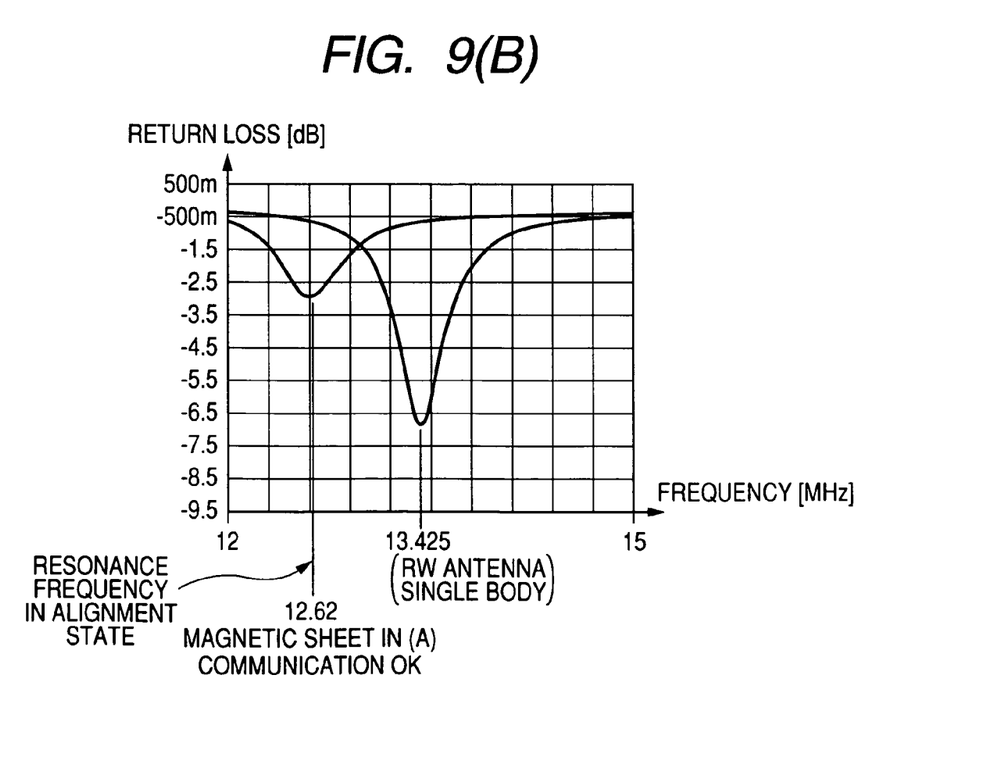

FIGS. 9(A), 9(B) are views explaining resonance frequency at non-contact communication in the embodiment. A position of the alignment mark 8 differs from that in FIG. 8(A), etc. The magnetic sheet 11 of the portable terminal 100 has a cut 11G.

As shown in FIG. 9(A), the cut 11G, when it is overlapped, overlaps with a part of the lateral direction bar of the RW antenna 50. A case of a length X=20 mm of the cut was evaluated.

As shown in FIG. 9(B), resonance frequency is 12.62 [MHz] and communication was also possible.

Figure 10A:
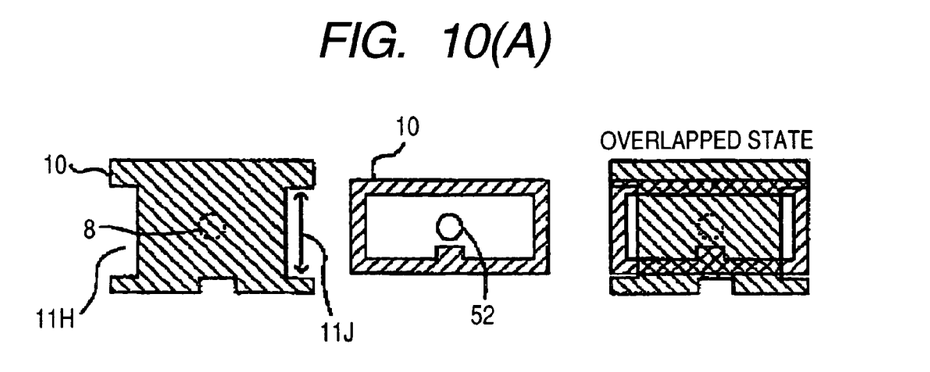
FIGS. 10(A), 10(B) are exemplary views explaining resonance frequency at non-contact communication in the embodiment.
Figure 10B:
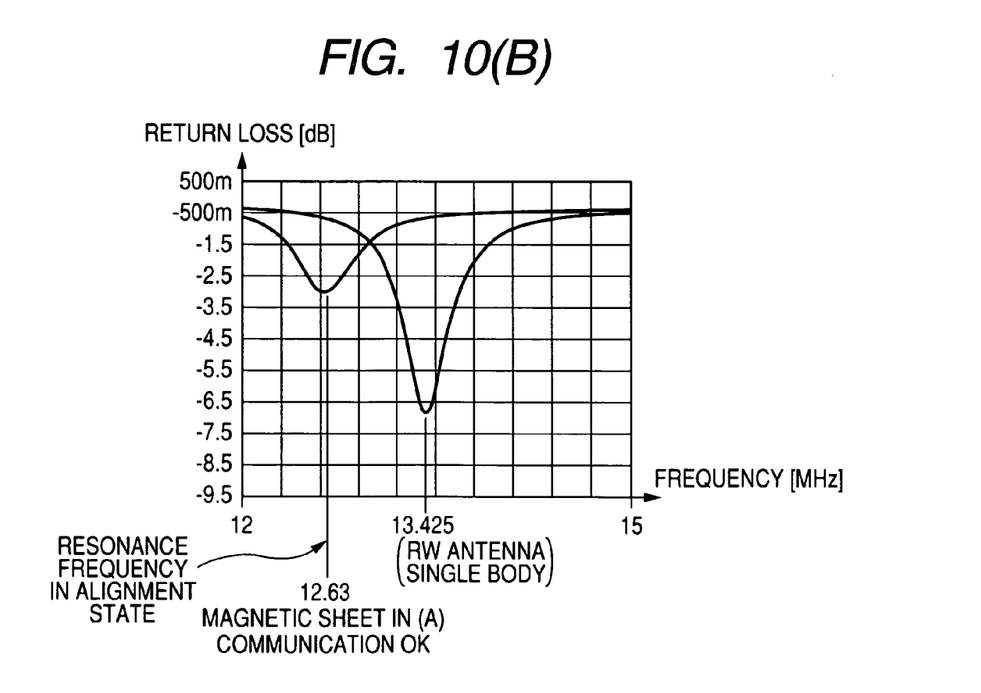

FIGS. 10(A), 10(B) are views explaining resonance frequency at non-contact communication in the embodiment. The magnetic sheet 11 of the portable terminal 100 is of a horizontally long shape, and has cuts 11H and 11J.

As shown in FIG. 10(A), the cuts 11H and 11J, when they are overlapped, overlap with a part of the lateral direction bar of the RW antenna 50. A case of a length X=20 mm of the cut was evaluated.

As shown in FIG. 10(B), resonance frequency is 12.63 [MHz] and communication was also possible.

Meanwhile, the cuts are disposed at two places, but may be disposed at one place.

As explained above, according to the embodiment, it becomes possible to improve performance of communication with an external reader/writer, in combination with maintenance of the eddy current reduction effect due to no extra deletion of the magnetic body, together with improvement of resonance frequency.

According to the above-described embodiment, it becomes possible to improve performance of communication with an external reader/writer, in combination with maintenance of the eddy current reduction effect caused by no deletion of an extra magnetic body.

What is claimed is:

1. A portable terminal which carries out non-contact communication with an external reader/writer at a specified relative position to the reader/writer, comprising:
   a second antenna configured to carry out non-contact communication with a loop shaped first antenna whose arrangement position and size are defined in the external reader/writer; and
   a magnetic sheet having a non magnetic region in a part of the magnetic sheet where the magnetic sheet at least partly overlaps with a loop of the loop shaped first antenna when the portable terminal is at the specified relative position to the external reader/writer,
   wherein a width of the non magnetic region of the magnetic sheet is substantially the equal to a distance between an outermost peripheral line and an innermost peripheral line of the loop of the loop of the loop shaped first antenna, and wherein a length of the non magnetic region is predetermined.

2. A portable terminal which carries out non-contact communication with an external reader/writer at a specified relative position to the external reader/writer, comprising:
   a loop shaped second antenna configured to carry out non-contact communication with a loop shaped first antenna whose arrangement position and size are defined in the external reader/writer;
   a battery pack arranged so as to overlap with a region within a loop of the loop shaped second antenna when the portable terminal is at the specified relative position to the external reader/writer; and
   a magnetic sheet that partly covers a surface of the battery pack, and has a non magnetic region where the magnetic sheet partly overlaps with a loop of the loop shaped first antenna when the portable terminal is at the specified relative position to the external reader/writer,
   wherein a width of the non magnetic region of the magnetic sheet is substantially the equal to a distance between an outermost peripheral line and an innermost peripheral line of the loop of the loop of the loop shaped first antenna, and wherein a length of the non magnetic region is predetermined.

3. The portable terminal according to claim 1, wherein the non magnetic region of the magnetic sheet comprises one or more hollow regions in the magnetic body, the one or more hollow regions being formed in a middle section of the magnetic sheet and away from an outer edge of the magnetic sheet.

4. The portable terminal according to claim 2, wherein the non magnetic region of the magnetic sheet comprises one or more hollow regions in the magnetic body, the one or more hollow regions being formed in a middle section of the magnetic sheet and away from an outer edge of the magnetic sheet.

5. The portable terminal according to claim 1, wherein the non magnetic region of the magnetic sheet comprises one or more hollow regions in the magnetic body, the one or more hollow regions being extending from an outer edge of the magnetic sheet.

6. The portable terminal according to claim 2, wherein the non magnetic region of the magnetic sheet comprises one or more hollow regions in the magnetic body, the one or more hollow regions being extending from an outer edge of the magnetic sheet.

7. The portable terminal according to claim 1, wherein the predetermined length of the non magnetic region of the magnetic sheet is 10 mm or more.

8. The portable terminal according to claim 2, wherein the predetermined length of the non magnetic region of the magnetic sheet is 10 mm or more.

* * * * *